United States Patent
Hou et al.

(10) Patent No.: US 11,856,321 B1
(45) Date of Patent: Dec. 26, 2023

(54) VIDEO PROCESSING METHOD AND APPARATUS

(71) Applicant: Huawei Technologies Co., Ltd., Shenzhen (CN)

(72) Inventors: Pengfei Hou, Xi'an (CN); Liwen Tan, Beijing (CN); Lei Zhang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/970,930

(22) Filed: Oct. 21, 2022

Related U.S. Application Data

(63) Continuation of application No. PCT/CN2021/085707, filed on Apr. 6, 2021.

(30) Foreign Application Priority Data

Apr. 24, 2020 (CN) .......................... 202010331493.2

(51) Int. Cl.
*H04N 5/92* (2006.01)
*G11B 27/34* (2006.01)

(52) U.S. Cl.
CPC ............... *H04N 5/92* (2013.01); *G11B 27/34* (2013.01)

(58) Field of Classification Search
CPC .................................. H04N 5/92; G11B 27/34
USPC ................ 386/241, 291, 292, 293, 294, 295
See application file for complete search history.

(56) References Cited

U.S. PATENT DOCUMENTS

| | | | |
|---|---|---|---|
| 7,295,752 B1* | 11/2007 | Jain | H04N 7/17336 386/281 |
| 7,778,516 B2* | 8/2010 | David | G06F 16/48 386/239 |
| 8,130,794 B2* | 3/2012 | Kabuto | H04N 21/43074 370/503 |
| 9,871,994 B1* | 1/2018 | Vaden | G11B 27/34 |
| 10,067,813 B2* | 9/2018 | An | G06F 11/079 |
| 10,942,026 B2* | 3/2021 | Barton | H04N 1/00204 |
| 2023/0109035 A1* | 4/2023 | Hendry | H04N 19/187 375/240.12 |
| 2023/0209071 A1* | 6/2023 | Hendry | H04N 19/31 375/240.26 |

* cited by examiner

*Primary Examiner* — Helen Shibru
(74) *Attorney, Agent, or Firm* — Conley Rose, P.C.

(57) ABSTRACT

A video processing method includes: receiving a video stream from a camera component; converting the video stream into at least one first data packet, where the at least one first data packet is independently encoded or decoded; and storing a first data packet obtained in a first reporting cycle as a first video clip.

20 Claims, 12 Drawing Sheets

VIDEO PROCESSING METHOD AND APPARATUS

CROSS-REFERENCE TO RELATED APPLICATIONS

This is a continuation of International Patent Application No. PCT/CN2021/085707 filed on Apr. 6, 2021, which claims priority to Chinese Patent Application No. 202010331493.2 filed on Apr. 24, 2020. The disclosures of the aforementioned applications are hereby incorporated by reference in their entireties.

TECHNICAL FIELD

Embodiments of this disclosure relate to the information technology field, and in particular, to a video processing method and apparatus.

BACKGROUND

With continuous economy development, private vehicles are increasingly popular. A vehicle owner usually installs various camera components for a private vehicle. For example, a camera can be installed at a vehicle rear to assist in reversing, and a dashboard camera can be installed on the vehicle to record a driving process.

In the conventional technology, the camera component (for example, the dashboard camera) installed on the vehicle usually independently completes video preview, recording, storage, and playing. In a video recording process, to provide a video fault recovery capability, the camera component usually needs to write index data when writing video data. There are two implementations for the index data. One is to calculate index space based on resolution and a frame rate, pre-write an index, and then continuously write the video data into a memory. Because a pre-written index usually does not match a size of actual index space and an actual index location, an index space waste may be caused.

The other is to continuously write indices into a memory in the video recording process. However, relatively large storage space is occupied if the indices are continuously written into the memory in the video recording process. As a result, the storage space occupied by video recording is relatively large.

SUMMARY

Embodiments of this disclosure provide a video processing method and apparatus, to resolve a problem in the conventional technology that video recording occupies relatively large storage space.

According to a first aspect, an embodiment of this disclosure provides a video processing method. The method may be applied to a video processing apparatus, or may be applied to a chip in a video processing apparatus. The video processing apparatus may be, for example, an in-vehicle terminal. The following describes the method by using an example in which the method is applied to an in-vehicle terminal. In the method, the in-vehicle terminal receives a video stream collected by a camera component, and converts the video stream into at least one first data packet. The first data packet is independently encoded or decoded. Then, the in-vehicle terminal synthesizes a first data packet obtained within a first reporting cycle into a first video clip, and stores the first video clip. The first reporting cycle is less than or equal to maximum allowable video loss duration, and the maximum allowable video loss duration is a longest loss time that is of a video shot by the camera component and that is allowed by a user when a fault occurs.

According to the video processing method provided in the first aspect, because the collected video stream is converted into the at least one first data packet that can be independently encoded or decoded, when a fault occurs in a video recording process, video decoding may still be independently completed for the first video clip that is stored in the in-vehicle terminal and that includes the first data packet. Therefore, an index does not need to be written during video recording, and storage space occupied by the video recording is reduced, so that a video with a longer time can be stored.

In a feasible manner, the first data packet is a transport stream (TS) packet.

In a feasible manner, if the video stream includes a TS packet, the in-vehicle terminal may obtain at least one TS packet from the video stream after removing a protocol header from the video stream.

According to the video processing method provided in this feasible manner, when the video stream includes the TS packet, the in-vehicle terminal directly removes the protocol header to obtain the at least one TS packet from the video stream, and synthesizes the at least one TS packet into the first video clip, and stores the first video clip. The first video clip synthesized by using the TS packet may be independently encoded or decoded, thereby saving storage space occupied by video recording, so that a video with a longer time can be stored in the storage space.

In a feasible manner, if the video stream includes an elementary stream (ES) packet, the in-vehicle terminal obtains at least one ES packet from the video stream after removing a protocol header from the video stream, and then encapsulates the at least one ES packet into at least one TS packet.

According to the video processing method provided in this feasible manner, when the video stream includes the ES packet, the in-vehicle terminal obtains the at least one ES packet from the video stream by removing the protocol header, encapsulates the ES packet into the TS packet, and finally synthesizes the at least one TS packet into the first video clip for storage. The first video clip synthesized by using the TS packet may be independently encoded or decoded, thereby saving storage space occupied by video recording, so that a video with a longer time can be stored in the storage space.

In a feasible manner, if the video stream is a raw stream, the in-vehicle terminal obtains, from the video stream, the raw stream corresponding to the video stream after removing a protocol header from the video stream, and encodes the raw stream to generate at least one ES packet. Finally, the in-vehicle terminal encapsulates the at least one ES packet into at least one TS packet.

According to the video processing method provided in this feasible manner, when the video stream is the raw stream, the in-vehicle terminal obtains, by removing the protocol header, the raw stream corresponding to the video stream from the video stream, encodes the raw stream to generate the ES packet, then encapsulates the ES packet into the TS packet, and finally synthesizes the at least one TS packet into the first video clip for storage. The first video clip synthesized by using the TS packet may be independently encoded or decoded, thereby saving storage space occupied by video recording, so that a video with a longer time can be stored in the storage space.

In a feasible manner, the protocol header is a Real Time Streaming Protocol (RTSP) header.

In a feasible manner, data volumes of all first data packets are the same.

In a feasible manner, the in-vehicle terminal may further combine at least one first video clip into at least one video file based on a standard data volume of a video file, and store the at least one video file based on a first video format.

By using the video processing method provided in this feasible manner, it is avoided that a video is stored in a form of a large number of first video clips, so that it is more convenient for a user to view the video. In addition, the video file may be stored based on a playing format of a video playing component. This facilitates fast playing on the video playing component.

In a feasible manner, the in-vehicle terminal may further obtain a speed of a vehicle on which the camera component is located, and if a decrease of the speed of the vehicle in a first time period exceeds a first threshold, store a first video clip in a second time period in an independent storage area.

A start time point of the first time period is a time point at which a driving pedal of the vehicle is stepped down, duration of the first time period is first preset duration, an intermediate time point of the second time period is the time point at which the driving pedal of the vehicle is stepped down, and duration of the second time period is second preset duration.

According to the video processing method provided in this feasible manner, a video can be urgently recorded when the vehicle brakes or collides, and the in-vehicle terminal may quickly extract a key event video from the independent storage area.

In a feasible manner, the in-vehicle terminal may further locate the first video clip in the second time period based on a timestamp of the first video clip. The timestamp of the first video clip is used to identify a time when recording of the first video clip starts.

According to a second aspect, an embodiment of this disclosure provides a video processing apparatus. The video processing apparatus includes a receiving module configured to receive a video stream collected by a camera component, and a processing module configured to convert the video stream into at least one first data packet, where the first data packet is independently encoded or decoded, and synthesize a first data packet obtained within a first reporting cycle into a first video clip, and store the first video clip, where the first reporting cycle is less than or equal to maximum allowable video loss duration, and the maximum allowable video loss duration is a longest loss time that is of a video shot by the camera component and that is allowed by a user when a fault occurs.

In a feasible manner, if the video stream includes a TS packet, the processing module is further configured to remove a protocol header from the video stream to obtain at least one TS packet from the video stream.

In a feasible manner, if the video stream includes an ES packet, the processing module is further configured to remove a protocol header from the video stream to obtain at least one ES packet from the video stream, and encapsulate the at least one ES packet into at least one TS packet.

In a feasible manner, if the video stream is a raw stream, the processing module is further configured to remove a protocol header from the video stream to obtain, from the video stream, the raw stream corresponding to the video stream, encode the raw stream to generate at least one ES packet, and encapsulate the at least one ES packet into at least one TS packet.

In a feasible manner, the protocol header is an RTSP header.

In a feasible manner, data volumes of all first data packets are the same.

In a feasible manner, the processing module is further configured to combine at least one first video clip into at least one video file based on a standard data volume of a video file, and store the at least one video file based on a first video format.

In a feasible manner, the receiving module is further configured to obtain a speed of a vehicle on which the camera component is located, and the processing module is further configured to, if a decrease of the speed of the vehicle in a first time period exceeds a first threshold, store a first video clip in a second time period in an independent storage area.

A start time point of the first time period is a time point at which a driving pedal of the vehicle is stepped down, duration of the first time period is first preset duration, an intermediate time point of the second time period is the time point at which the driving pedal of the vehicle is stepped down, and duration of the second time period is second preset duration.

In a feasible manner, the processing module is further configured to locate the first video clip in the second time period based on a timestamp of the first video clip. The timestamp of the first video clip is used to identify a time when recording of the first video clip starts.

According to a third aspect, an embodiment of this disclosure provides an in-vehicle terminal. The in-vehicle terminal includes a processor, a memory, a transmitter, and a receiver. The transmitter and the receiver are coupled to the processor, the processor controls a sending action of the transmitter, and the processor controls a receiving action of the receiver.

The memory is configured to store computer-executable program code, and the program code includes information. When the processor executes the information, the information enables a network device to perform the video processing method provided in the possible implementations of the first aspect.

According to a fourth aspect, an embodiment of this disclosure provides a chip, including a processor configured to invoke a computer program from a memory and run the computer program, so that a device on which the chip is installed performs the video processing method provided in the implementations of the first aspect.

According to a fifth aspect, an embodiment of this disclosure provides a computer-readable storage medium configured to store a computer program. The computer program enables a computer to perform the video processing method provided in the implementations of the first aspect.

According to a sixth aspect, an embodiment of this disclosure provides a computer program product, including computer program information. The computer program information enables a computer to perform the video processing method provided in the implementations of the first aspect.

According to a seventh aspect, an embodiment of this disclosure provides a computer program. The computer program enables a computer to perform the video processing method provided in the implementations of the first aspect.

According to an eighth aspect, an embodiment of this disclosure provides a storage medium. The storage medium stores a computer program, including the video processing method according to the first aspect or the implementations of the first aspect when the program is executed by a processor.

According to the video processing method and apparatus provided in embodiments of this disclosure, the video stream collected by the camera component is received, and the video stream is converted into the at least one first data packet. The first data packet is independently encoded or decoded, and then the first data packet obtained within the first reporting cycle is stored as the first video clip. According to the method, because the collected video stream is converted into the at least one first data packet that can be independently encoded or decoded, when a fault occurs in a video recording process, video decoding may still be independently completed for the stored first video clip including the first data packet. Therefore, an index does not need to be written during video recording, and storage space occupied by video recording is reduced, so that a video with a longer time can be stored.

DESCRIPTION OF EMBODIMENTS

To make the objectives, technical solutions, and advantages of the present disclosure clearer, the following clearly describes the technical solutions in embodiments of the present disclosure with reference to the accompanying drawings in embodiments of the present disclosure. It is clear that the described embodiments are a part rather than all of embodiments of the present disclosure. All other embodiments obtained by persons of ordinary skill in the art based on embodiments of the present disclosure without creative efforts shall fall within the protection scope of the present disclosure.

With economy development, private vehicles are increasingly popular. A vehicle owner usually installs various camera components for a private vehicle. For example, a camera can be installed at a vehicle rear to assist in reversing, and a dashboard camera can be installed on the vehicle to record a driving process.

Figure 1:
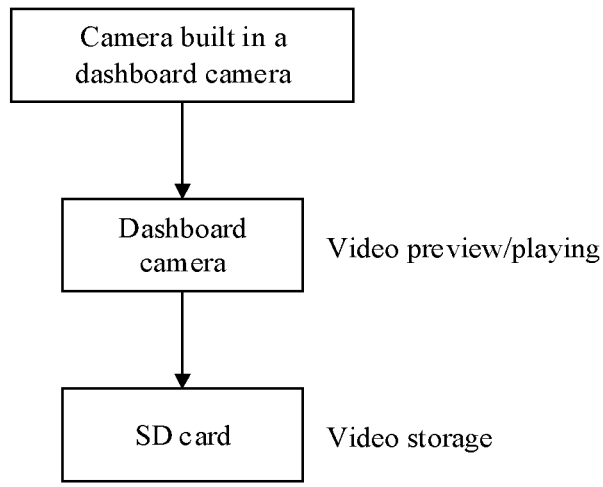
FIG. 1 is a schematic diagram of a video processing method in the conventional technology.

In the conventional technology, the camera component installed on the vehicle usually independently completes video preview, recording, storage, and playing. FIG. 1 is a schematic diagram of a video processing method in the conventional technology. As shown in FIG. 1, for example, after shooting a video stream, a camera built in a dashboard camera sends the video stream to the dashboard camera to complete video preview and playing, and stores the video in a Secure Digital (SD) memory card built in the dashboard camera.

In a video recording process, to provide a video fault recovery capability, the camera component usually needs to write index data when writing video data. The index data includes information such as a frame rate and resolution of a video, and is used to decode the video data when the video is played. There are two implementations for the index data. One is to calculate index space based on the resolution and the frame rate, pre-write an index, and then continuously write the video data into a memory. Because a pre-written index usually does not match a size of actual index space and an actual index location either, an index space waste may be caused. Therefore, the first manner is usually not used.

The other is to continuously write indices into a memory in the video recording process. However, relatively large storage space is occupied if the indices are continuously written into the memory in the video recording process. As a result, the storage space occupied by video recording is relatively large.

In consideration of the foregoing problem, an embodiment of this disclosure provides a video processing method, to reduce storage space occupied by video recording. In this embodiment of this disclosure, a received video stream is stored in a form that can be directly decoded. Therefore, an index does not need to be written during video recording, and storage space occupied by video recording is reduced, so that a video with a longer time can be stored.

The video processing method provided in this embodiment of this disclosure is applicable to processing of a video stream shot by a camera component of a vehicle, for example, a dashboard camera, and applicable to processing of a video stream shot by another non-vehicle video component, for example, a surveillance camera or a camera.

Figure 2:
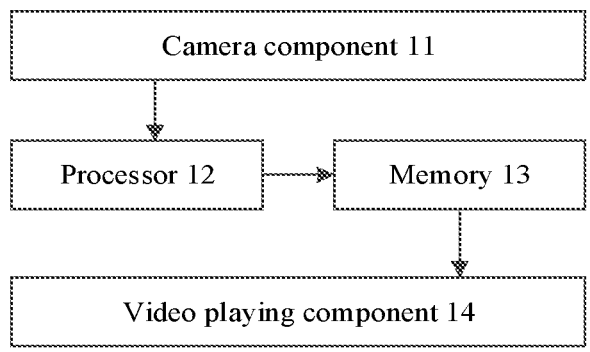
FIG. 2 is a diagram of a system architecture of a video processing method according to an embodiment of this disclosure.

FIG. 2 is a diagram of a system architecture of a video processing method according to an embodiment of this disclosure. As shown in FIG. 2, a camera component 11, a processor 12, a memory 13, and a video playing component 14 are included. When shooting a video, the in-vehicle camera component 11 may transmit a shot video stream to the processor 12, and the processor 12 converts the video stream into at least one first data packet that is independently encoded or decoded. Then, the processor 12 synthesizes a plurality of first data packets into a first video clip based on a reporting cycle, and stores the first video clip in the memory 13. When playing needs to be performed, the video playing component 14 may extract the first video clip from the memory 13 for playing.

A type of the camera component 11 is not limited in this embodiment of this disclosure. For example, the camera component may be a dashboard camera, a camera, or the like. A type of the memory 13 is not limited in this embodiment of this disclosure either. For example, the memory may be a hard disk, an SD card, or the like.

For example, the processor 12 may be a processor of an in-vehicle terminal. The video playing component 14 may be a video playing module on the in-vehicle terminal, a mobile phone on a vehicle, or the like.

It may be understood that the video processing method provided in this embodiment of this disclosure is performed by a video processing apparatus. The video processing apparatus may be implemented by any software and/or hardware, and may be a part or all of the in-vehicle terminal, for example, may be the processor in the in-vehicle terminal.

The following uses an in-vehicle terminal integrated with or installed with related execution code as an example to describe in detail the technical solutions in embodiments of this disclosure by using specific embodiments. The following several specific embodiments may be combined with each other, and a same or similar concept or process may not be described repeatedly in some embodiments.

Figure 3:
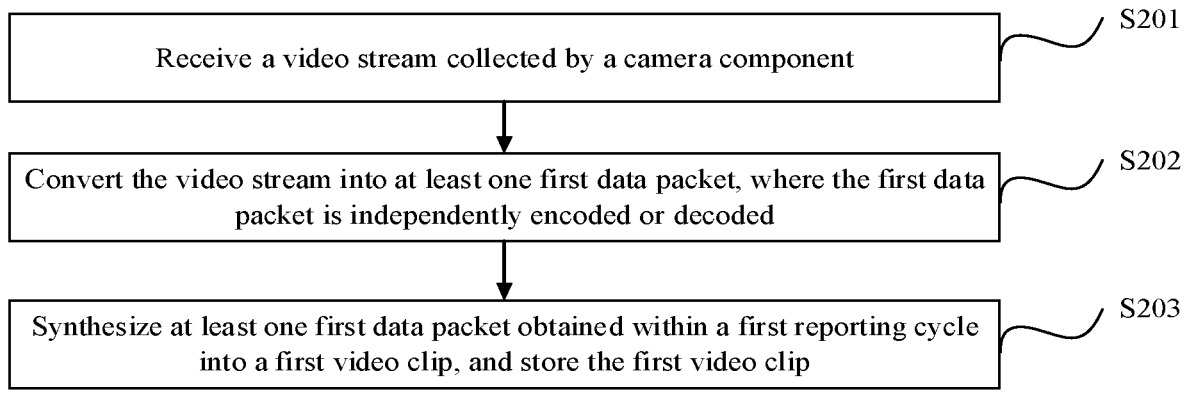
FIG. 3 is a schematic flowchart of a video processing method according to an embodiment of this disclosure.

FIG. 3 is a schematic flowchart of a video processing method according to an embodiment of this disclosure. This embodiment relates to a specific process of how an in-vehicle terminal stores a received video stream. As shown in FIG. 3, the video processing method includes the following steps.

S201: The in-vehicle terminal receives a video stream collected by a camera component.

In this step, after collecting a video, the camera component may transmit the video stream to the in-vehicle terminal.

A type of the camera component is not limited in this embodiment of this disclosure. For example, the camera component may be a dashboard camera, a camera, or the like. A quantity of camera components is not limited in this embodiment of this disclosure. There may be one or more camera components. Correspondingly, the in-vehicle terminal may receive a video stream sent by one camera component, or may receive video streams sent by a plurality of camera components.

A type of the video stream is not limited in this embodiment of this disclosure either, and may be set according to a transmission protocol. For example, the video stream may be a RTSP stream. RTSP is an application layer protocol in a Transmission Control Protocol (TCP)/Internet Protocol (IP) system. There may be a plurality of packaging formats in the RTSP stream, for example, a TS format, an ES format, or a raw stream format.

A raw stream can be encoded into an ES stream, and the ES stream can be packaged into a TS stream. The raw stream is a data stream that is not encoded, and the raw stream includes both audio data and video data. The ES stream is a data stream including only one type of content, and includes several ES packets, for example, an ES stream including only video data or an ES stream including only audio data. When the raw stream is encoded, the video data and the audio data may be divided first, and the raw stream is encoded into an ES stream including only the video data and an ES stream including only the audio data. An ES packet in the ES stream may be further encapsulated into a TS packet to form a TS stream. The TS packet may be independently encoded or decoded.

In some embodiments, the video stream further includes a protocol header, and when processing the video stream, a terminal device needs to first remove the protocol header from the video stream. For example, if the video stream is an RTSP stream, correspondingly, the video stream includes an RTSP header.

In some embodiments, if the video stream is an RTSP stream, correspondingly, the in-vehicle terminal may extend an RTSP instruction, and an extended RTSP instruction is used to add capabilities of querying and setting a video stream type. After receiving the video stream, the in-vehicle terminal may determine a packaging format of the video stream according to the RTSP instruction.

S202: The in-vehicle terminal converts the video stream into at least one first data packet, where the first data packet is independently encoded or decoded.

In this step, after receiving the video stream, the in-vehicle terminal first needs to remove the protocol header from the video stream, and then converts the video stream into the at least one first data packet based on a packaging type of the video stream. The in-vehicle terminal may query the packaging format of the video stream by using the foregoing extended RTSP instruction.

The first data packet may be a TS packet.

Figure 4A:
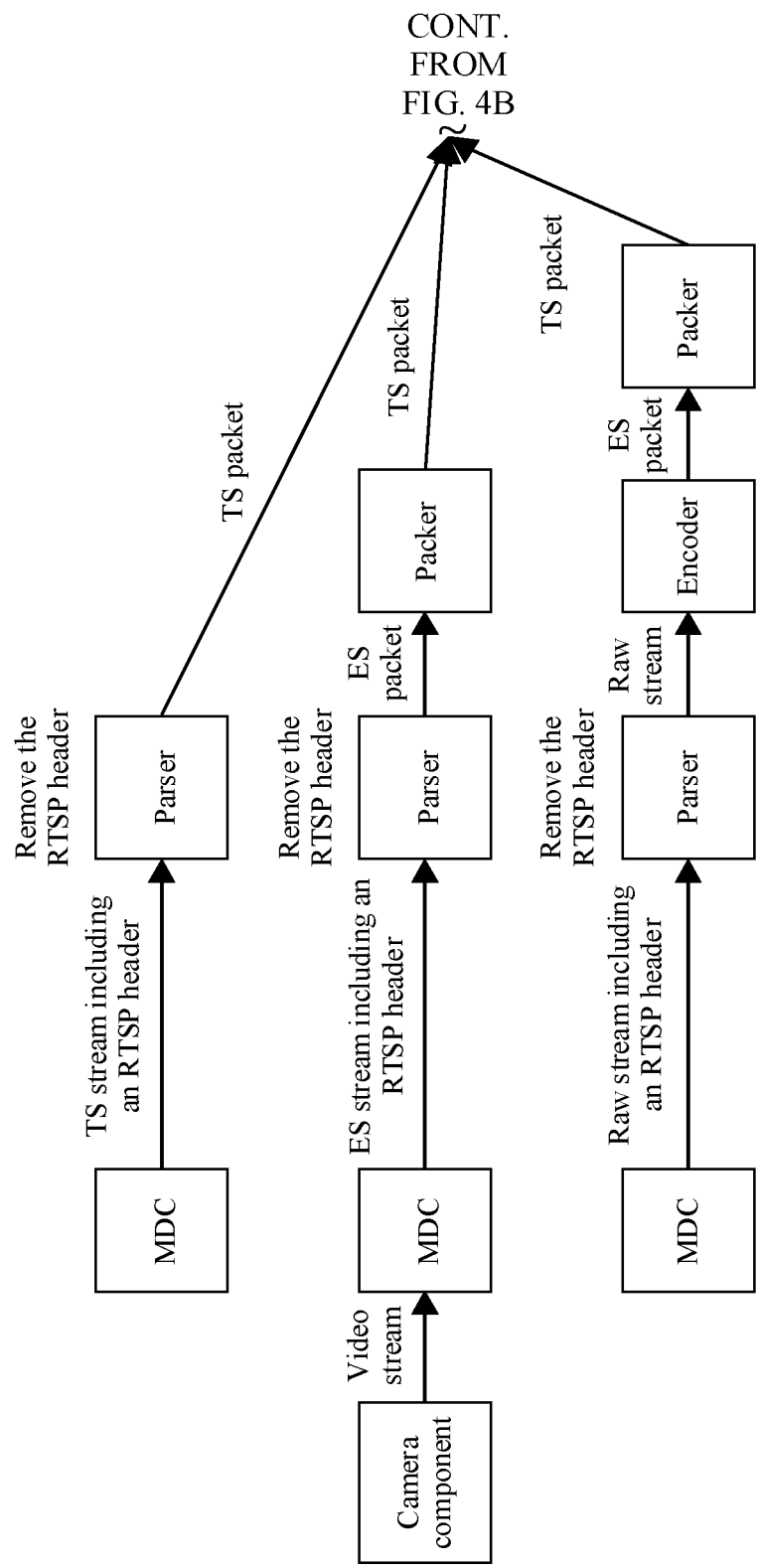
FIG. 4A and FIG. 4B are a schematic diagram of synthesizing a first video clip according to an embodiment of this disclosure.
Figure 4B:
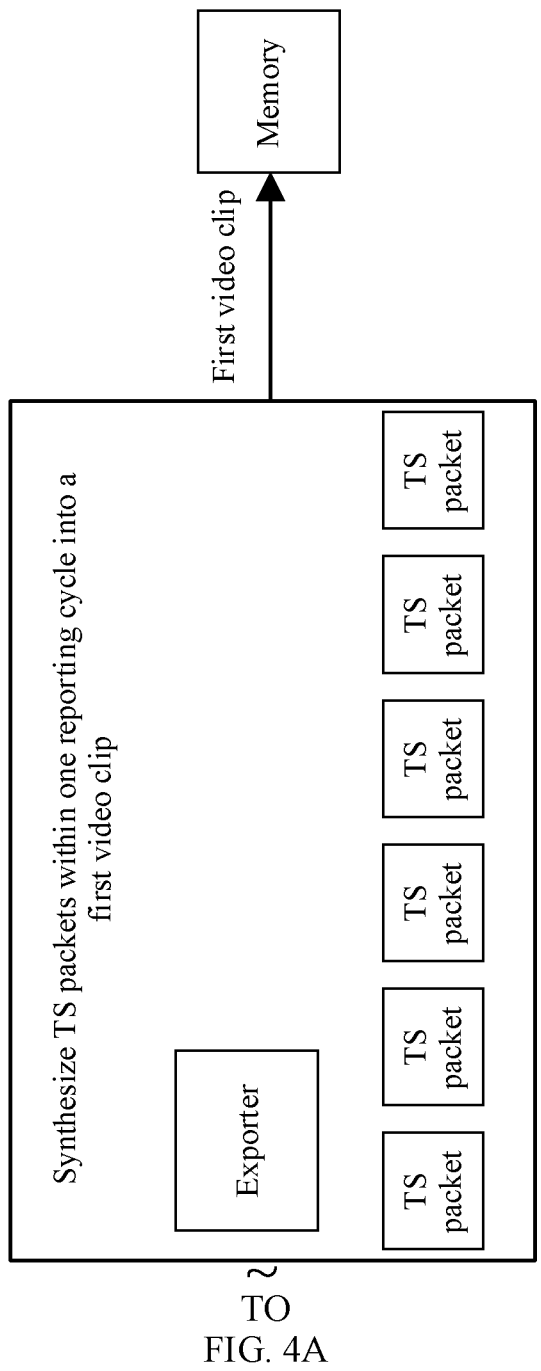

For example, FIG. 4A and FIG. 4B are a schematic diagram of video stream storage according to an embodiment of this disclosure. As shown in FIG. 4A and FIG. 4B, after obtaining video collection data, the camera component sends the video stream to a manufacturing data collector (MDC) of the in-vehicle terminal, and the MDC sends the video stream to a parser of the in-vehicle terminal, so that the parser removes the RTSP header from the video stream. The video stream collected by the camera may be a TS stream, an ES stream, or a raw stream, and a specific video stream format may be determined based on the packaging format specified in RTSP.

For example, if the video stream is the TS stream, after removing the RTSP header, the parser may obtain at least one TS packet, and then the parser sends the at least one TS packet to an exporter of the in-vehicle terminal. If the video stream is the ES stream, after removing the RTSP header, the parser may obtain at least one ES packet, and then the parser sends the at least one ES packet to a packer of the in-vehicle terminal, so that the packer encapsulates the at least one ES packet into at least one TS packet and sends the TS packet to an exporter. If the video stream is the raw stream, after removing the RTSP header, the parser may send the raw stream to an encoder of the in-vehicle terminal for encoding, to obtain at least one ES packet, and then the encoder sends the at least one ES packet to a packer of the in-vehicle terminal, so that the packer encapsulates the at least one ES packet into at least one TS packet and sends the TS packet to an exporter.

S203: The in-vehicle terminal synthesizes at least one first data packet obtained within a first reporting cycle into a first video clip, and stores the first video clip.

In this step, after converting the video stream into the at least one first data packet, the in-vehicle terminal may synthesize the at least one first data packet obtained within the first reporting cycle into the first video clip, and store the first video clip. The first video clip may be a TS video clip.

The reporting cycle may be 1 second, 0.5 seconds, or the like. Duration of the first reporting cycle is not limited in this embodiment of this disclosure. The reporting cycle may be less than or equal to maximum allowable video loss duration, and the maximum allowable video loss duration is a longest loss time that is of a video shot by the camera component and that is allowed by a user when a fault occurs. For example, if the maximum allowable video loss duration is 1 second, correspondingly, the reporting cycle may be 1 second, or may be 0.5 seconds.

In some embodiments, if the reporting cycle is 0.5 seconds, correspondingly, the in-vehicle terminal synthesizes, every 0.5 seconds, the at least the first data packet cached within the reporting cycle into the first video clip, and outputs the first video clip to a memory. Because the memory stores a video clip every 0.5 seconds, even if a power failure occurs, video data of a maximum of 0.5 seconds is lost.

In this disclosure, the in-vehicle terminal may determine a quantity of first data packets within the first reporting cycle based on video resolution and the duration of the first reporting cycle. For example, if the first reporting cycle is 0.5 seconds, and the video resolution is 1080 P, it is learned through calculation based on 1080 P that about 1 megabyte (MB) first data packet cache is generated in 0.5 seconds. When the first data packet is a TS packet, because each TS packet fixedly includes 188 bytes, 5577 TS packets may be generated within the first reporting cycle. Then, the exporter of the in-vehicle terminal may output a first video clip synthesized by using the 5577 TS packets to the memory.

It should be noted that, in this embodiment of this disclosure, how to synthesize the at least one first data packet into the first video clip is not limited, and all data packets may be simply connected head to tail in a time sequence to synthesize the first video clip.

Refer to FIG. 4A and FIG. 4B. The following describes how to store a video stream by using an example in which there are six TS packets within one reporting cycle. After the video stream is converted into at least one TS packet, the at least one TS packet may be sent to the exporter. In the exporter, a queue of TS packets waits to be written out during the reporting cycle, and the TS packets are synthesized into the first video clip. If there are six TS packets in one reporting cycle, the six TS packets are connected head to tail to form a first video clip. Then, the exporter outputs the first video clip to the memory.

Figure 5:
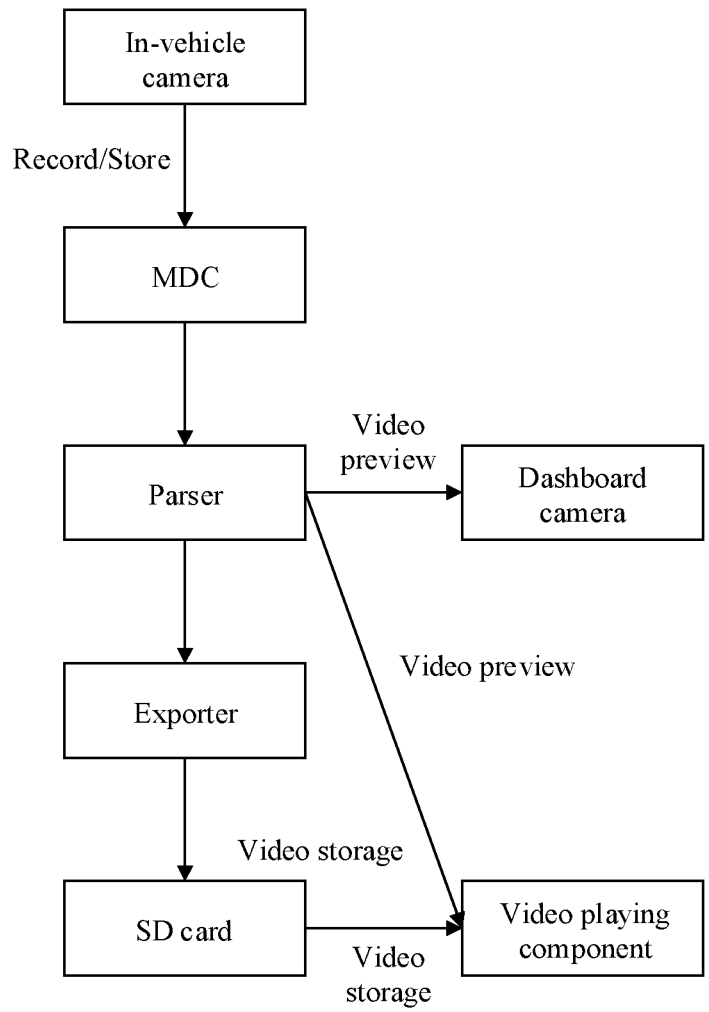
FIG. 5 is a schematic diagram of interaction of a video processing method according to an embodiment of this disclosure.

FIG. 5 is a schematic diagram of interaction of a video processing method according to an embodiment of this disclosure. As shown in FIG. 5, an example in which the video stream is a TS stream is used to describe a manner of processing a collected video. After an in-vehicle camera collects the video stream, the in-vehicle camera sends the video stream to the MDC of the in-vehicle terminal, and then the MDC sends the video stream to the parser of the in-vehicle terminal, so that the parser removes the RTSP header to obtain at least one TS packet. The parser sends the at least one TS packet to the exporter of the in-vehicle terminal, so that the exporter sends the first video clip to an SD card for storage after forming the at least one TS packet within the first reporting cycle into the first video clip. When the user needs to play the first video clip, a video playing component may extract the first video clip from the SD card for playing. In addition, when the user needs to perform video preview by using a dashboard camera or the video playing component, the parser may convert the at least one TS packet into a raw stream that can be directly previewed and played, and send the raw stream to the dashboard camera or the video playing component for video preview.

According to the video processing method provided in this embodiment of this disclosure, the video stream collected by the camera component is received, and the video stream is converted into the at least one first data packet. The first data packet may be independently encoded or decoded. Then, the first data packet obtained within the first reporting cycle is stored as the first video clip. According to the method, because the collected video stream is converted into the at least one first data packet that can be independently encoded or decoded, when a fault occurs in a video recording process, video decoding may still be independently completed for the stored first video clip including the first data packet. Therefore, an index does not need to be written during video recording, and storage space occupied by video recording is reduced, so that a video with a longer time can be stored.

Based on this, in this disclosure, no index space is wasted when a video is stored, a video with a longer time, a higher frame rate, and higher resolution can be stored, and a more flexible storage policy can be provided. In addition, through adaptive conversion of a video stream format, all data packets in different encapsulation formats can be converted into video data that can be automatically encoded and decoded for storage.

On the basis of the foregoing embodiment, the video stream that is sent by the camera component and that is received by the in-vehicle terminal may be in a plurality of different forms. In some embodiments, the video stream includes a TS packet. In some embodiments, the video stream includes an ES packet. In some other embodiments, the video stream may be a raw stream. For video streams in different packaging formats, the video streams may be converted into at least one first data packet in different manners, and then the at least one first data packet is formed into at least one first video clip.

Figure 6:
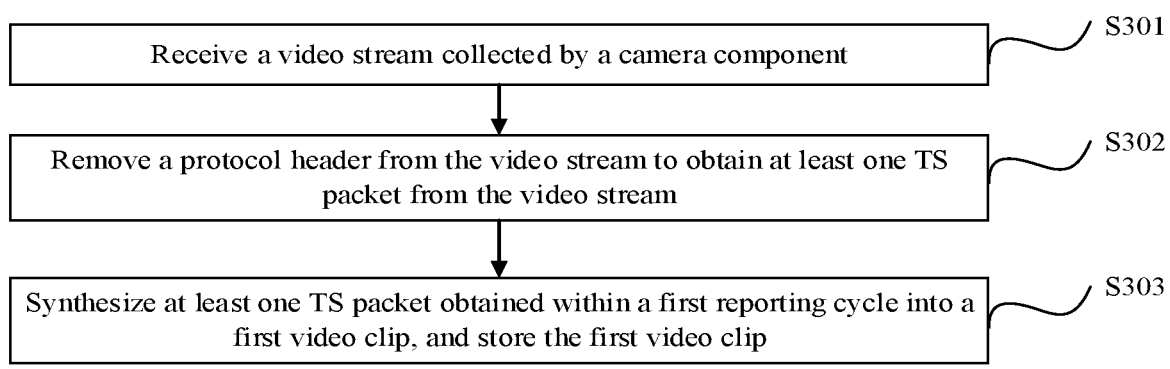
FIG. 6 is a schematic flowchart of another video processing method according to an embodiment of this disclosure.
Figure 7:
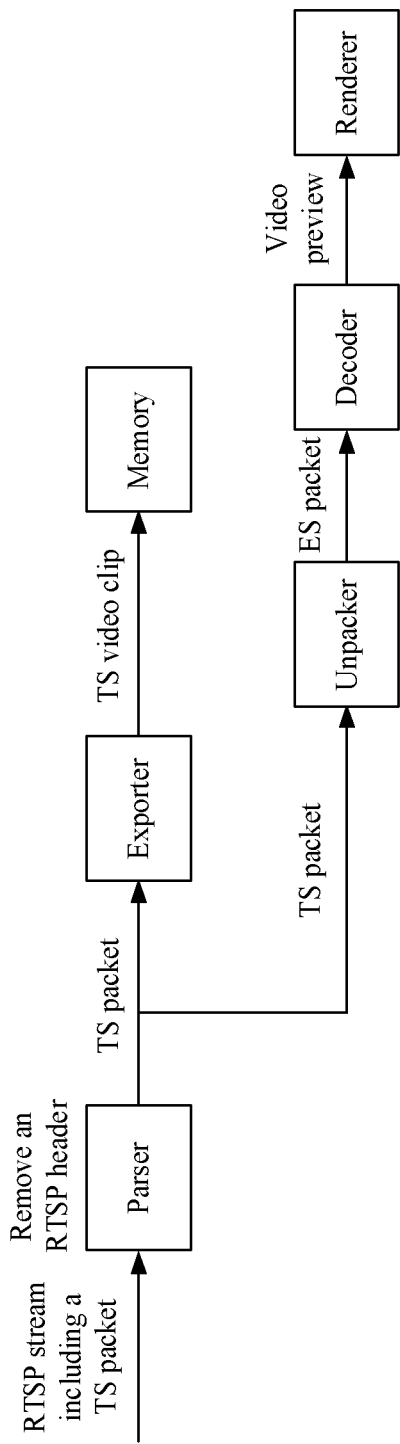
FIG. 7 is a schematic diagram of interaction of another video processing method according to an embodiment of this disclosure.

The following describes how to convert the video stream into the at least one first video clip when the video stream includes the TS packet. FIG. 6 is a schematic flowchart of another video processing method according to an embodiment of this disclosure. FIG. 7 is a schematic diagram of interaction of another video processing method according to an embodiment of this disclosure. FIG. 7 corresponds to the video processing method in FIG. 6. On the basis of the foregoing embodiment, the video processing method includes the following steps.

S301: An in-vehicle terminal receives a video stream collected by a camera component.

In this embodiment, a specific implementation process and implementation principle of step S301 are similar to those of step S201 in FIG. 3. Details are not described herein again. Further, after an in-vehicle camera collects the video stream, the in-vehicle camera sends the video stream to an MDC of the in-vehicle terminal, and then the MDC sends the video stream to a parser of the in-vehicle terminal.

S302: The in-vehicle terminal removes a protocol header from the video stream to obtain at least one TS packet from the video stream.

In this step, after the in-vehicle terminal receives the video stream collected by the camera component, because the video stream includes the TS packet, after removing the protocol header from the video stream, the in-vehicle terminal may directly obtain the at least one TS packet from the video stream.

Further, as shown in FIG. 7, that the video stream is the TS stream is used as an example. After obtaining the video stream including the TS packet, the parser may remove an RTSP header from the video stream to obtain the at least one TS packet. Then, the parser sends the at least one TS packet to an exporter of the in-vehicle terminal.

S303: The in-vehicle terminal synthesizes at least one TS packet obtained within a first reporting cycle into a first video clip, and stores the first video clip.

In this embodiment, a specific implementation process and implementation principle of step S303 are similar to those in step S203. Details are not described herein again. Further, as shown in FIG. 7, after synthesizing the at least one TS packet within the first reporting cycle into a TS video clip, the exporter stores the TS video clip in a memory.

Figure 8:
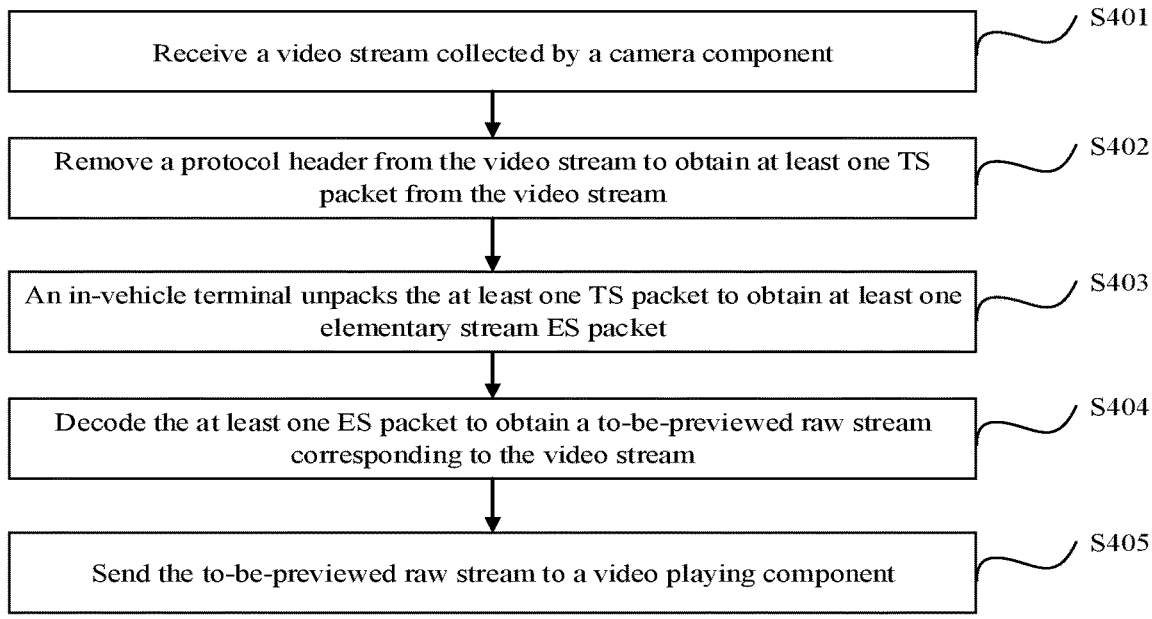
FIG. 8 is a schematic flowchart of still another video processing method according to an embodiment of this disclosure.

In the foregoing embodiment, after receiving the video stream that includes the TS packet and that is collected by the camera component, the in-vehicle terminal may convert the video stream into the at least one first video clip and store the at least one first video clip in the memory. In addition, after receiving the video stream that includes the TS packet and that is collected by the camera component, the in-vehicle terminal may further process the video stream, and then send the processed video stream to the video playing component for direct preview and playing. Refer to FIG. 8. The method further includes the following steps.

S401: The in-vehicle terminal receives the video stream collected by the camera component.

S402: The in-vehicle terminal removes the protocol header from the video stream to obtain the at least one TS packet from the video stream.

In this embodiment, a specific implementation process and implementation principle of steps S401 and S402 are similar to those of steps S301 and S302 in FIG. 6. Details are not described herein again.

Further, as shown in FIG. 7, after obtaining the at least one TS packet from the video stream, the parser may send the at least one TS packet to an unpacker of the in-vehicle terminal.

S403: The in-vehicle terminal unpacks the at least one TS packet to obtain at least one elementary stream ES packet.

In this step, after removing the protocol header from the video stream and obtaining the at least one TS packet from the video stream, the in-vehicle terminal may convert the at least one TS packet into the at least one ES packet. Further, as shown in FIG. 7, after obtaining the at least one TS packet sent by the parser, the unpacker may unpack the at least one TS packet to obtain the at least one ES packet. Each TS packet corresponds to a plurality of ES packets. Then, the unpacker may send the ES packet obtained through unpacking to a decoder. How the unpacker unpacks the TS packet is not limited in this embodiment of this disclosure, and may unpack the TS packet based on an existing TS packet unpacking manner, to obtain the at least one ES packet.

S404: The in-vehicle terminal decodes the at least one ES packet to obtain a to-be-previewed raw stream corresponding to the video stream.

Further, as shown in FIG. 7, after obtaining the at least one ES packet, the decoder may decode the at least one ES packet to obtain the to-be-previewed raw stream corresponding to the video stream.

In this embodiment of this disclosure, how the decoder decodes the ES packet may be limited based on an existing ES packet decoding manner, to obtain the to-be-previewed raw stream corresponding to the video stream.

S405: The in-vehicle terminal sends the to-be-previewed raw stream to the video playing component.

Further, as shown in FIG. 7, after the decoder obtains the to-be-previewed raw stream corresponding to the video stream, the decoder may send the to-be-previewed raw stream to the video playing component. Then, a renderer of the video playing component may render a video for preview based on the raw stream.

According to the video processing method provided in this embodiment of this disclosure, the video stream collected by the camera component is received, the protocol header is removed from the video stream, the at least one TS packet is obtained from the video stream, and the first data packet obtained within the first reporting cycle is stored as the first video clip. According to the method, because the collected video stream is converted into at least one first data packet that can be independently encoded or decoded, when a fault occurs in a video recording process, video decoding may still be independently completed for the stored first video clip including the first data packet. Therefore, an index does not need to be written during video recording, and storage space occupied by video recording is reduced, so that a video with a longer time can be stored.

Figure 9:
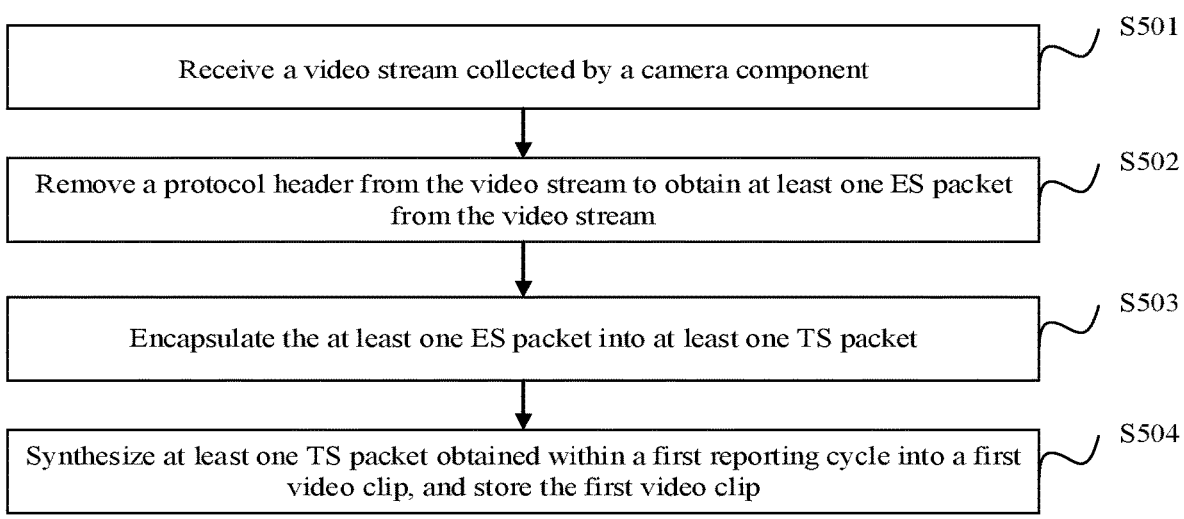
FIG. 9 is a schematic flowchart of yet another video processing method according to an embodiment of this disclosure.
Figure 10:
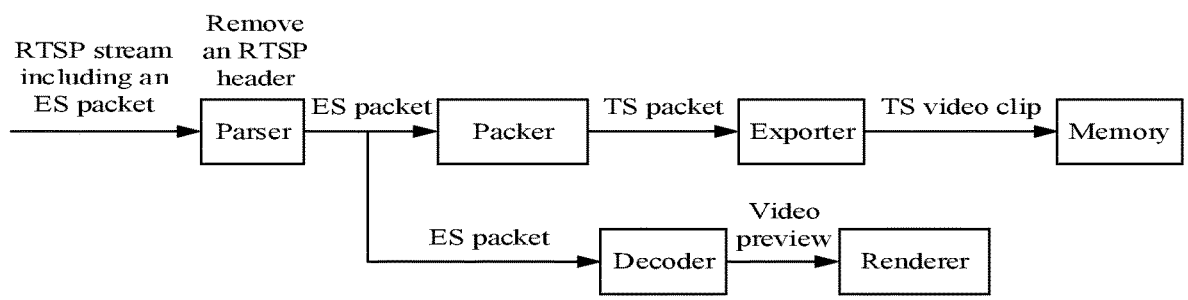
FIG. 10 is a schematic diagram of interaction of still another video processing method according to an embodiment of this disclosure.

The following describes how to convert the video stream into the at least one first video clip when the video stream includes the ES packet. FIG. 9 is a schematic flowchart of yet another video processing method according to an embodiment of this disclosure. FIG. 10 is a schematic diagram of interaction of still another video processing method according to an embodiment of this disclosure. FIG. 10 corresponds to the video processing method in FIG. 9. The video processing method includes the following steps.

S501: An in-vehicle terminal receives a video stream collected by a camera component.

In this embodiment, a specific implementation process and implementation principle of step S401 are similar to those in step S201. Details are not described herein again. Further, after an in-vehicle camera collects the video stream, the in-vehicle camera sends the video stream to an MDC of the in-vehicle terminal, and then the MDC sends the video stream to a parser of the in-vehicle terminal.

S502: The in-vehicle terminal removes a protocol header from the video stream to obtain at least one ES packet from the video stream.

In this step, after the in-vehicle terminal receives the video stream collected by the camera component, because the video stream includes the ES packet, after removing the protocol header from the video stream, the in-vehicle terminal may directly obtain the at least one ES packet from the video stream.

Further, as shown in FIG. 10, that the video stream is the ES stream is used as an example. After obtaining the video stream including the ES packet, the parser of the in-vehicle terminal may remove an RTSP header from the video stream to obtain the at least one ES packet. Then, the parser sends the at least one ES packet to a packer of the in-vehicle terminal.

S503. The in-vehicle terminal encapsulates the at least one ES packet into at least one TS packet.

In this step, after removing the protocol header from the video stream and obtaining the at least one ES packet from the video stream, the in-vehicle terminal may encapsulate the at least one ES packet into the at least one TS packet.

Further, as shown in FIG. 10, after receiving the at least one ES packet, the packer may encapsulate the at least one ES packet into the at least one TS packet, and then send the at least one TS packet to an exporter of the in-vehicle terminal.

S504: The in-vehicle terminal synthesizes at least one TS packet obtained within a first reporting cycle into a first video clip, and stores the first video clip.

In this embodiment, a specific implementation process and implementation principle of step S504 are similar to those of step S203 in FIG. 3. Details are not described herein again. Further, as shown in FIG. 10, after synthesizing the at least one TS packet within the first reporting cycle into a TS video clip, the exporter stores the TS video clip in a memory.

Figure 11:
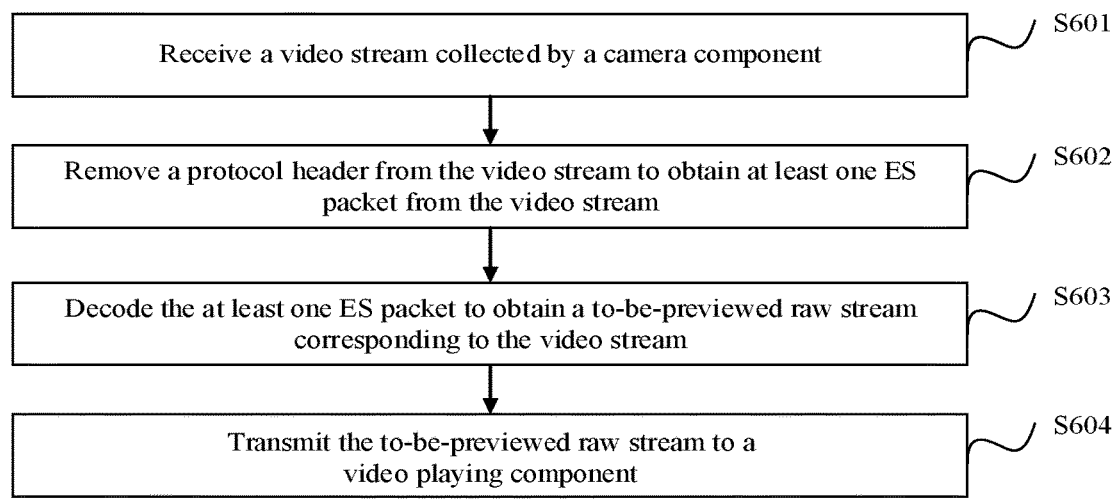
FIG. 11 is a schematic flowchart of yet another video processing method according to an embodiment of this disclosure.

On the basis of the foregoing embodiment, after receiving the video stream that includes the ES packet and that is collected by the camera component, the in-vehicle terminal may convert the video stream into the at least one first video clip and store the at least one first video clip in the memory. In addition, after receiving the video stream collected by the camera component, the in-vehicle terminal may further process the video stream, and then send the processed video stream to a video playing component for direct preview and playing. Refer to FIG. 11. The method further includes the following steps.

S601: The in-vehicle terminal receives the video stream collected by the camera component.

S602: The in-vehicle terminal removes the protocol header from the video stream to obtain the at least one ES packet from the video stream.

In this embodiment, a specific implementation process and implementation principle of steps S601 and S602 are similar to those of steps S501 and S502 in FIG. 5. Details are not described herein again.

Further, as shown in FIG. 10, after obtaining the at least one ES packet from the video stream, the parser may send the at least one ES packet to a decoder of the in-vehicle terminal.

S603: The in-vehicle terminal decodes the at least one ES packet to obtain a to-be-previewed raw stream corresponding to the video stream.

Further, as shown in FIG. 10, after receiving the at least one ES packet sent by the parser, the decoder may decode the at least one ES packet to obtain the to-be-previewed raw stream corresponding to the video stream.

S604: The in-vehicle terminal transmits the to-be-previewed raw stream to the video playing component.

In this embodiment, a specific implementation process and implementation principle of steps S603 and S604 are similar to those of steps S404 and S405 in FIG. 7. Details are not described herein again.

Further, as shown in FIG. 10, after the decoder obtains the to-be-previewed raw stream corresponding to the video stream, the decoder may send the to-be-previewed raw stream to the video playing component. Then, a renderer of the video playing component may render a video for preview based on the raw stream.

According to the video processing method provided in this embodiment of this disclosure, the video stream collected by the camera component is received, the protocol header is removed from the video stream, the at least one ES packet is obtained from the video stream, and the at least one ES packet is encapsulated into the at least one TS packet. According to the method, because the collected video stream is converted into the at least one first data packet that can be independently encoded or decoded, when a fault occurs in a video recording process, video decoding may still be independently completed for the stored first video clip including the first data packet. Therefore, an index does not need to be written during video recording, and storage space occupied by video recording is reduced, so that a video with a longer time can be stored.

Figure 12:
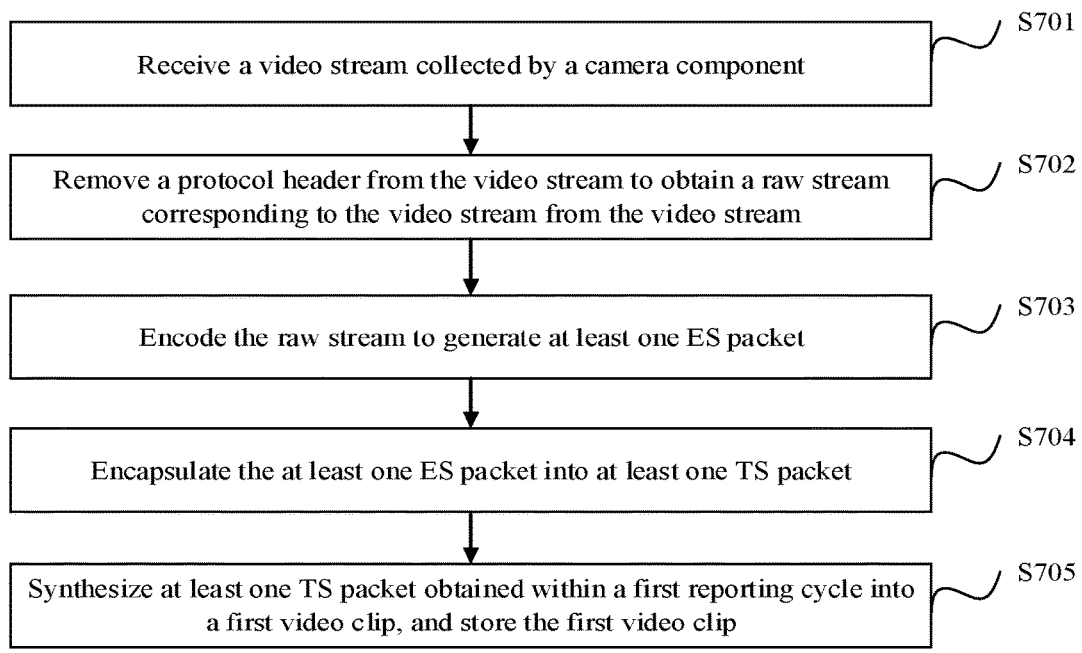
FIG. 12 is a schematic flowchart of yet another video processing method according to an embodiment of this disclosure.
Figure 13:
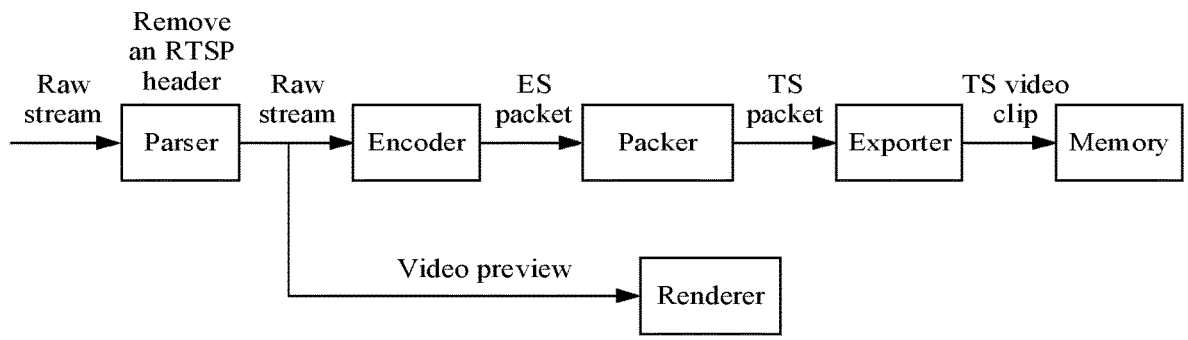
FIG. 13 is a schematic diagram of interaction of still another video processing method according to an embodiment of this disclosure.

The following describes how to convert the video stream into the at least one first video clip when the video stream is the raw stream. FIG. 12 is a schematic flowchart of yet another video processing method according to an embodiment of this disclosure. FIG. 13 is a schematic diagram interaction of another video processing method according to an embodiment of this disclosure. FIG. 13 corresponds to the video processing method in FIG. 12. The video processing method includes the following steps.

S701: An in-vehicle terminal receives a video stream collected by a camera component.

In this embodiment, a specific implementation process and implementation principle of step S701 are similar to those of step S201 in FIG. 3. Details are not described herein again. Further, after an in-vehicle camera collects the video stream, the in-vehicle camera sends the video stream to an MDC of the in-vehicle terminal, and then the MDC sends the video stream to a parser of the in-vehicle terminal.

S702: The in-vehicle terminal removes a protocol header from the video stream to obtain a raw stream corresponding to the video stream from the video stream.

Further, as shown in FIG. 13, that the video stream is the raw stream is used as an example. After obtaining the video stream, the parser may remove an RTSP header from the video stream to obtain the raw stream. Then, the parser sends the raw stream to an encoder of the in-vehicle terminal.

S703: The in-vehicle terminal encodes the raw stream to generate at least one ES packet.

In this embodiment of this disclosure, how to encode the raw stream to generate the ES packet is limited, and an existing raw stream encoding manner may be used. Further, as shown in FIG. 13, the encoder encodes the raw stream to generate the at least one ES packet, and sends the at least one ES packet to a packer of the in-vehicle terminal.

S704: The in-vehicle terminal encapsulates the at least one ES packet into at least one TS packet.

Further, as shown in FIG. 13, after encapsulating the at least one ES packet into the at least one TS packet, the packer sends the at least one TS packet to an exporter of the in-vehicle terminal.

S705: The in-vehicle terminal synthesizes at least one TS packet obtained within a first reporting cycle into a first video clip, and stores the first video clip.

Further, as shown in FIG. 13, after synthesizing the at least one TS packet within the first reporting cycle into a TS video clip, the exporter stores the TS video clip in a memory.

Figure 14:
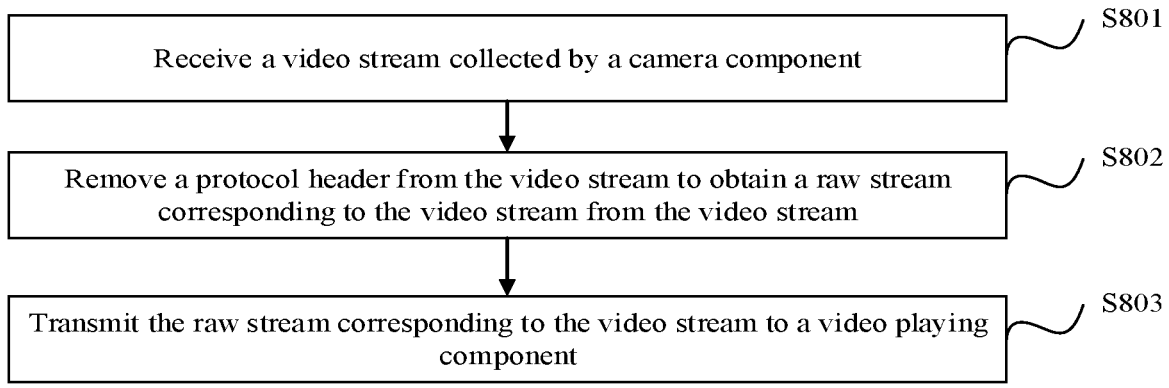
FIG. 14 is a schematic flowchart of yet another video processing method according to an embodiment of this disclosure.

On the basis of the foregoing embodiment, after receiving the raw stream collected by the camera component, the in-vehicle terminal may convert the video stream into the at least one first video clip and store the at least one first video clip in the memory. In addition, after receiving the video stream collected by the camera component, the in-vehicle terminal may further process the video stream, and then send the processed video stream to a video playing component for direct preview and playing. Refer to FIG. 14. The method further includes the following steps.

S801: The in-vehicle terminal receives the video stream collected by the camera component.

S802: The in-vehicle terminal removes the protocol header from the video stream to obtain the raw stream corresponding to the video stream from the video stream.

S803: The in-vehicle terminal transmits the raw stream corresponding to the video stream to the video playing component.

In this embodiment, a specific implementation process and implementation principle of step S803 are similar to those of step S405 in FIG. 7. Details are not described herein again.

Further, as shown in FIG. 13, the parser of the in-vehicle terminal may remove the protocol header from the video stream to obtain, from the video stream, the raw stream corresponding to the video stream, and send a to-be-previewed raw stream to the video playing component. Then, a renderer of the video playing component may render a video for preview based on the raw stream.

According to the video processing method provided in this embodiment of this disclosure, the video stream collected by the camera component is received, the protocol header is removed from the video stream, the raw stream corresponding to the video stream is obtained from the video stream, then the raw stream is encoded to generate the at least one ES packet, and the at least one ES packet is encapsulated into the at least one TS packet. According to the method, because the collected video stream is converted into at least one first data packet that can be independently encoded or decoded, when a fault occurs in a video recording process, video decoding may still be independently completed for the stored first video clip including the first data packet. Therefore, an index does not need to be written during video recording, and storage space occupied by video recording is reduced, so that a video with a longer time can be stored.

Figure 15:
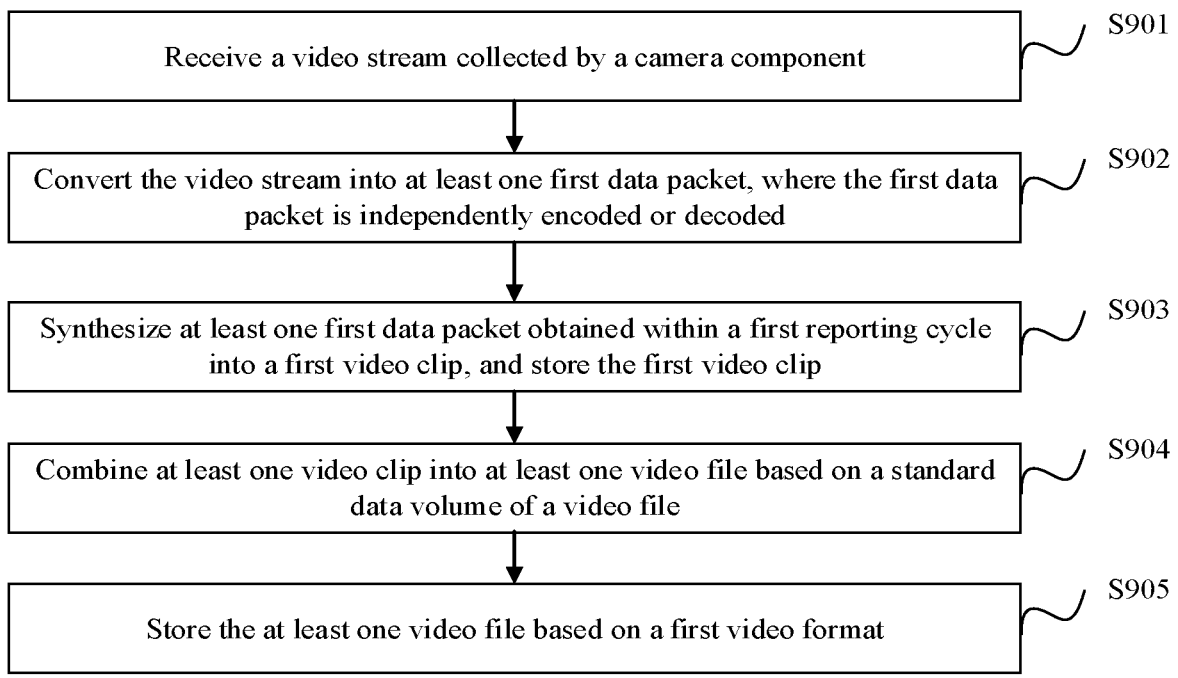
FIG. 15 is a schematic flowchart of yet another video processing method according to an embodiment of this disclosure.

On the basis of the foregoing embodiment, the first video clip may also be combined into a video file and then stored. The following describes how the in-vehicle terminal synthesizes a plurality of first video clips into one video file. FIG. 15 is a schematic flowchart of yet another video processing method according to an embodiment of this disclosure. On the basis of the foregoing embodiment, the video processing method includes the following steps.

S901: The in-vehicle terminal receives the video stream collected by the camera component.

S902: The in-vehicle terminal converts the video stream into the at least one first data packet, where the first data packet is independently encoded or decoded.

S903: The in-vehicle terminal synthesizes the at least one first data packet obtained within the first reporting cycle into the first video clip, and stores the first video clip.

In this embodiment, a specific implementation process and implementation principle of steps S901 to S903 are similar to those of steps S201 to S203 in FIG. 3. Details are not described herein again.

S904: The in-vehicle terminal combines the at least one video clip into the at least one video file based on a standard data volume of a video file.

In this step, after converting the video stream into the at least one first data packet, the in-vehicle terminal may combine the at least one video clip into the at least one video file based on the standard data volume of the video file.

The first data packet may be a TS packet. Because each TS packet carries metadata and the TS packet does not have additional metadata information, the data packet does not need to be parsed during combination, and the plurality of video clips may be quickly combined into one video file through a simple head-to-tail connection and in a file appending manner.

The standard data volume of the video file is not limited in this embodiment of this disclosure, and may be set based on an actual situation.

For example, if a standard data volume of each video file is 10 MBs, and one video clip is 1 MB, 10 video clips may be correspondingly synthesized into one video file.

Figure 16:
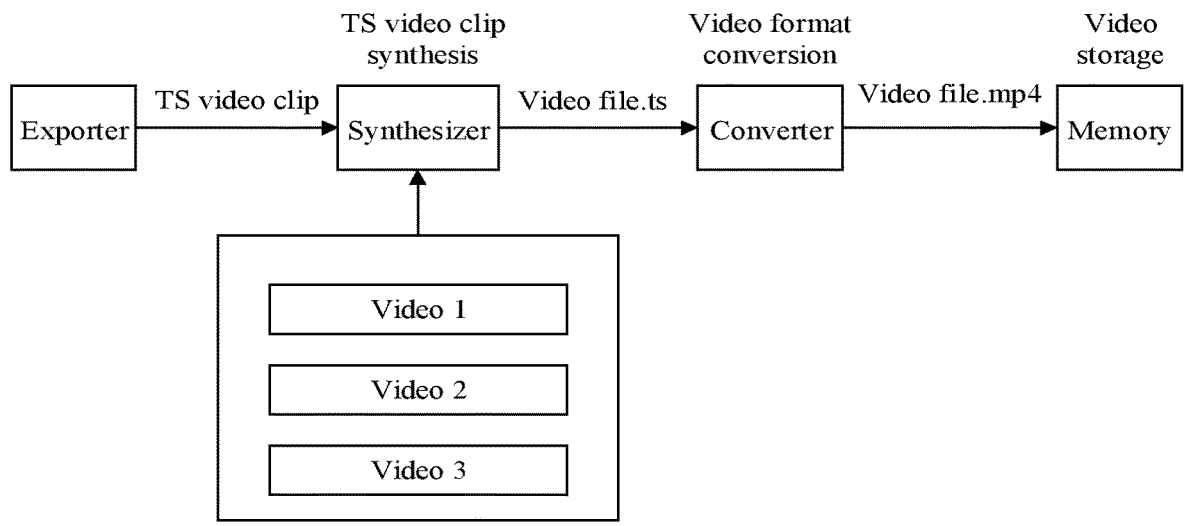
FIG. 16 is a schematic diagram of synthesizing a video clip according to an embodiment of this disclosure.

FIG. 16 is a schematic diagram of synthesizing a video clip according to an embodiment of this disclosure. Further, as shown in FIG. 16, a synthesizer of the in-vehicle terminal receives TS video clips video 1, video 2, and video 3 from the exporter of the in-vehicle terminal. If a total video data volume of the TS video clips video 1, video 2, and video 3 complies with a preset standard data volume, the synthesizer combines the TS video clips video 1, video 2, and video 3 into one video file, and sends the video file to a converter of the in-vehicle terminal.

S905: The in-vehicle terminal stores the at least one video file based on a first video format.

In this step, the in-vehicle terminal may preset a video format of a video file. For example, a TS video file may be played, or may be converted into a more general Moving Picture Experts Group (MPEG)-4 Part 14 (MP4) file by using the converter. If the first video format is a TS, correspondingly, the TS video file output by the in-vehicle terminal is directly stored without being converted. If the first video format is MP4, correspondingly, the TS video file output by the in-vehicle terminal needs to be converted to an MP4 format for storage.

Further, as shown in FIG. 16, the converter of the in-vehicle terminal may convert, based on a video format set by a user, the format of the video file sent by the synthesizer, and send a converted video file to the memory for storage. If the preset video format is the MP4 format, the format of the video file is converted into the MP4 format. The MP4 format may be more applicable to a playing format of the in-vehicle terminal.

According to the video processing method provided in this embodiment of this disclosure, the at least one video clip is combined into the at least one video file based on the standard data volume of the video file, and the at least one video file is stored based on the first video format. In this manner, by using a metadata feature of the TS, a TS video clip may be combined in a file appending manner, to implement quick video recovery. In addition, the video stream may be encapsulated into a plurality of video formats based on a user requirement.

Figure 17:
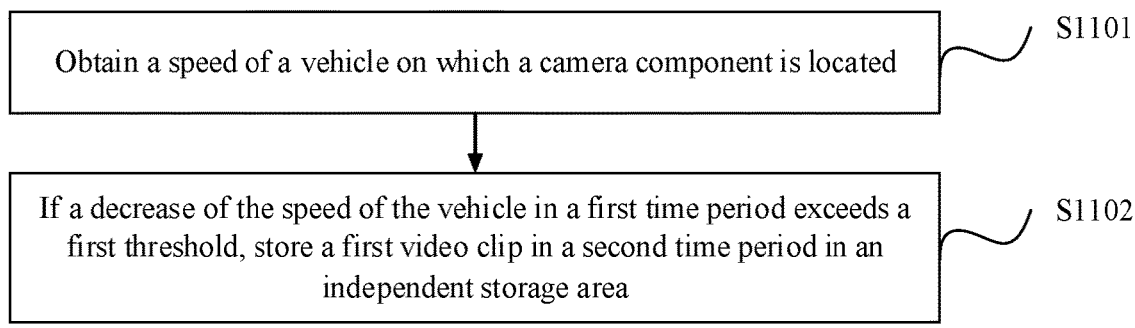
FIG. 17 is a schematic flowchart of another video processing method according to an embodiment of this disclosure.

The following describes how to store a video in an emergency. FIG. 17 is a schematic flowchart of yet another video processing method according to an embodiment of this disclosure. On the basis of the foregoing embodiment, the video processing method includes the following steps.

S1101: An in-vehicle terminal obtains a speed of a vehicle on which a camera component is located.

In this step, the in-vehicle terminal may detect, in real time, the speed of the vehicle on which the camera component is located.

How to obtain the speed of the vehicle is not limited in this embodiment of this disclosure. In some embodiments, a speed sensor may be disposed on the vehicle on which the camera component is located, and a real-time speed of the vehicle may be determined by using the speed sensor. In some other embodiments, the in-vehicle terminal may obtain real-time satellite positioning of the vehicle, to calculate the speed of the vehicle.

S1102: If a decrease of the speed of the vehicle in a first time period exceeds a first threshold, the in-vehicle terminal stores a first video clip in a second time period in an independent storage area.

A start time point of the first time period is a time point at which a driving pedal of the vehicle is stepped down, duration of the first time period is first preset duration, an intermediate time point of the second time period is the time point at which the driving pedal of the vehicle is stepped down, and duration of the second time period is second preset duration.

Figure 18:
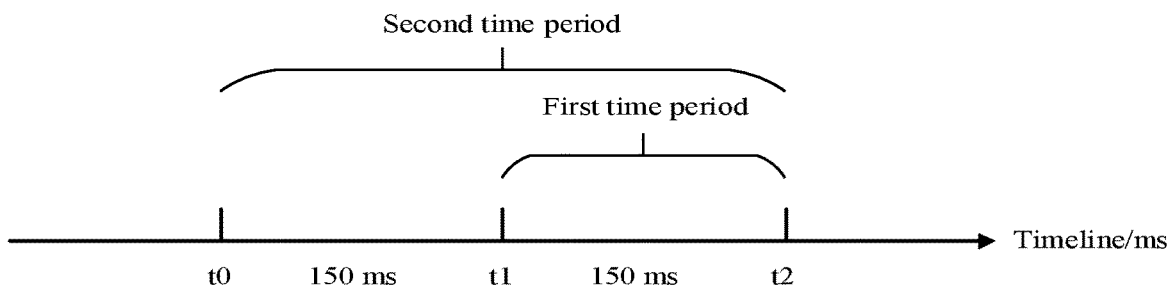
FIG. 18 is a schematic diagram of a first time period and a second time period according to an embodiment of this disclosure.

In this step, if the decrease of the speed of the vehicle in the first time period exceeds the first threshold, it may be determined that an accident occurs on the vehicle. In this case, the first video clip in the second time period may be stored in the independent storage area. It should be noted that the first preset duration and the second preset duration are not limited in this embodiment of this disclosure, and may be further set based on an actual situation. FIG. 18 is a schematic diagram of a first time period and a second time period according to an embodiment of this disclosure. The first preset duration may be 150 milliseconds (ms), and the second preset duration may be 300 ms. As shown in FIG. 18, for the first time period, a time point t1 at which the driving pedal of the vehicle is stepped down may be used as a start time point of the first time period, and a time point t2 that is 150 ms after t1 is used as an end time point of the first time period. In this case, a time period between t1 and t2 is the first time period. For the second time period, the time point t1 at which a driver steps down the driving pedal of the vehicle may be used as an intermediate time point of the second time period, and a time point t0 that is 150 ms before t1 is used as a start time point of the second time period, the time point t2 that is 150 ms after t1 is used as the end time point of the first time period. In this case, a time period between t0 and t2 is the second time period.

How the in-vehicle terminal determines the first video clip in the second time period is not limited in this embodiment of this disclosure either. In an optional implementation, the in-vehicle terminal may locate the first video clip in the second time period based on a timestamp of the first video clip. Further, the second time period may correspond to a plurality of first video clips, and each first video clip has a timestamp corresponding to the second time period. Therefore, the in-vehicle terminal may use the timestamp of the first video clip to locate the first video clip.

The timestamp of the first video clip may be used to identify a time when recording of the first video clip starts, and is recorded and generated by the in-vehicle terminal. For example, as shown in FIG. 4A and FIG. 4B, the first video clip includes a plurality of TS packets, and the time when recording of the first video clip starts may be a time when recording of a first TS packet starts. Subsequently, when storing the first video clip, the in-vehicle terminal may store the first video clip and the timestamp of the first video clip at the same time. When an accident occurs on the in-vehicle terminal, a key video within a time period of 15 seconds before and after braking may be quickly located by using the timestamp of the first video clip.

In a possible implementation, in step 1102, if the decrease of the speed of the vehicle in the first time period exceeds the first threshold, in addition to storing the first video clip in the second time period in the independent storage area, the in-vehicle terminal may also store the timestamp of the first video period in the independent storage area.

Figure 19:
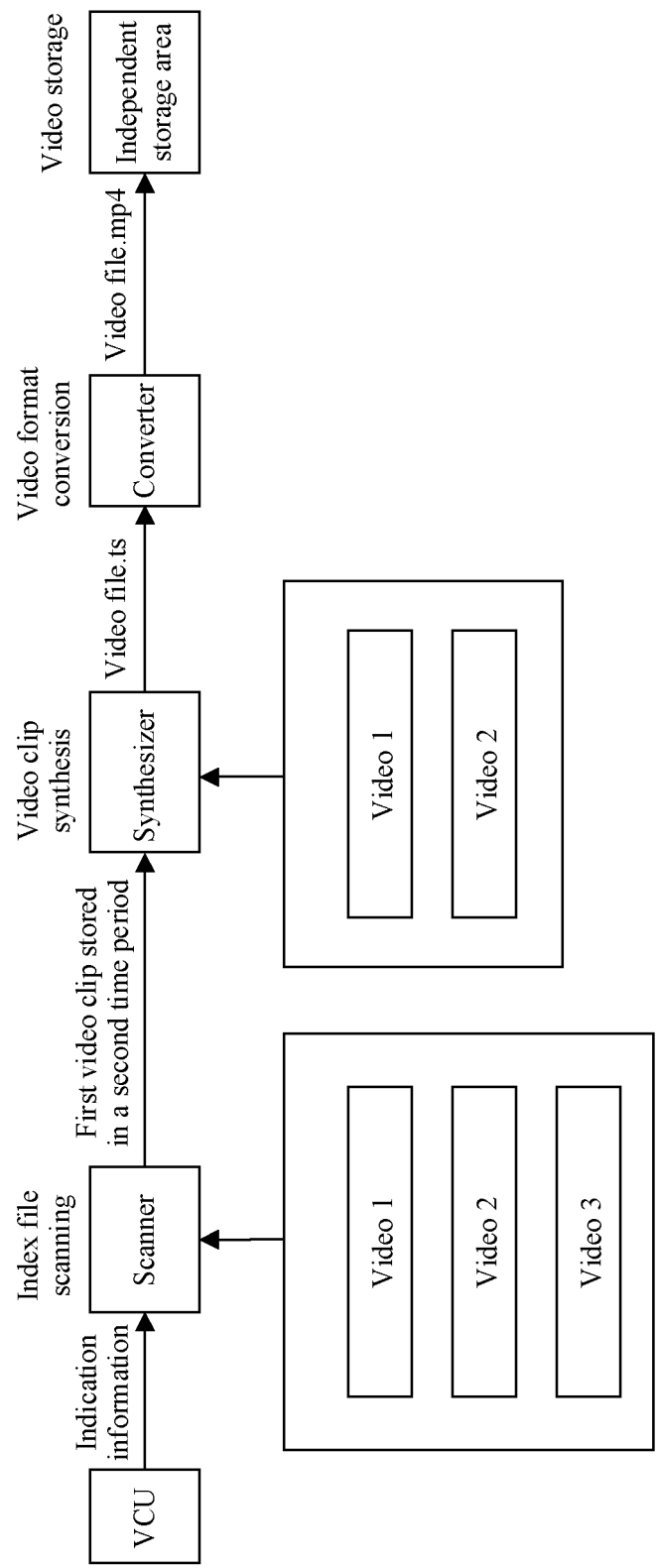
FIG. 19 is a schematic diagram of video storage during a vehicle emergency according to an embodiment of this disclosure.

FIG. 19 is a schematic diagram of video storage during a vehicle emergency according to an embodiment of this disclosure. As shown in FIG. 19, after detecting the speed of the vehicle, the sensor on the vehicle may transmit the speed of the vehicle to a vehicle control unit (VCU) of the in-vehicle terminal. When detecting that the decrease of the speed of the vehicle in the first time period exceeds the first threshold, the VCU determines that an emergency occurs on the vehicle. If the emergency is sent, the VCU may send indication information to a scanner of the in-vehicle terminal. The indication information is used to indicate the scanner to filter out, from a memory, the first video clip stored in the second time period. If first video clips video 1, video 2, and video 3 are stored in the memory when the scanner receives the indication information, where video 1 and video 2 are stored in the second period of time, the scanner may filter out video 1 and video 2 by scanning the timestamp of the first video clip. Then, the scanner sends video 1 and video 2 to a synthesizer of the in-vehicle terminal, and the synthesizer synthesizes video 1 and video 2 into a video file, and sends the video file to a converter of the in-vehicle terminal. Finally, the converter converts the video file into an MP4 format and sends the converted video file to the memory for independent storage.

For example, the VCU may identify and report a sudden braking event by determining a braking amplitude. If the VCU detects that the decrease of the speed is greater than 25 km/h in the first time period 150 ms, the VCU may determine that an accident occurs. In this case, the VCU defines and reports an emergency, and sends indication information to the scanner, to indicate the scanner to quickly locate a key video in a period of 15 seconds before and after braking by using the timestamp, and move the key video to a dedicated storage area.

According to the video processing method provided in this embodiment of this disclosure, the in-vehicle terminal obtains the speed of the vehicle on which the camera component is located, and locates the first video clip in the second time period based on the timestamp of the first video period. If the decrease of the speed of the vehicle in the first time period exceeds the first threshold, the first video clip in the second time period is stored in the independent storage area. In this manner, when the accident occurs, the key event video can be quickly moved to the independent storage area by using the timestamp, and after the accident, the key event video can be quickly extracted from the independent storage area, to obtain a more valuable video more quickly.

Persons of ordinary skill in the art may understand that all or some of the steps of the method embodiments may be implemented by program information related hardware. The program may be stored in a computer-readable storage medium. When the program runs, the steps of the method embodiments are performed. The foregoing storage medium includes various media that can store program code, such as a read-only memory (ROM), a random-access memory (RAM), a magnetic disk, or an optical disc.

Figure 20:
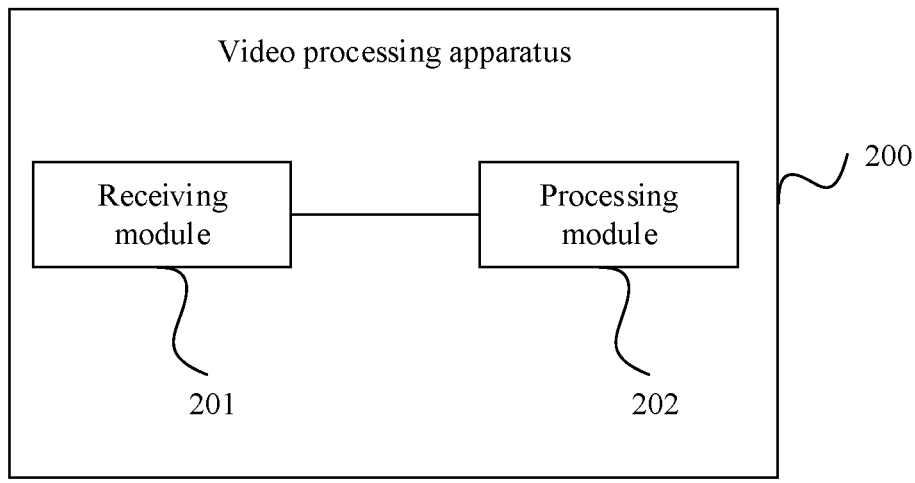
FIG. 20 is a schematic diagram of a structure of a video processing apparatus according to an embodiment of this disclosure.

FIG. 20 is a schematic diagram of a structure of a video processing apparatus according to an embodiment of this disclosure. The video processing apparatus may be implemented by using software, hardware, or a combination thereof, to execute the foregoing video processing method. As shown in FIG. 20, the video processing apparatus 200 includes a receiving module 201 and a processing module 202.

The receiving module 201 is configured to receive a video stream collected by a camera component.

The processing module 202 is configured to convert the video stream into at least one first data packet, where the first data packet is independently encoded or decoded, and synthesize a first data packet obtained within a first reporting cycle into a first video clip, and store the first video clip, where the first reporting cycle is less than or equal to maximum allowable video loss duration, and the maximum allowable video loss duration is a longest loss time that is of a video shot by the camera component and that is allowed by a user when a fault occurs.

In an optional implementation, the first data packet is a transport stream TS packet.

In an optional implementation, if the video stream includes a TS packet, the processing module 202 is further configured to remove a protocol header from the video stream to obtain at least one TS packet from the video stream.

In an optional implementation, if the video stream includes an ES packet, the processing module 202 is further configured to remove a protocol header from the video stream to obtain at least one ES packet from the video stream, and encapsulate the at least one ES packet into at least one TS packet.

In an optional implementation, if the video stream is a raw stream, the processing module 202 is further configured to remove a protocol header from the video stream to obtain, from the video stream, the raw stream corresponding to the video stream, encode the raw stream to generate at least one ES packet, and encapsulate the at least one ES packet into at least one TS packet.

In an optional implementation, the protocol header is an RTSP header.

In an optional implementation, data volumes of all first data packets are the same.

In an optional implementation, the processing module 202 is further configured to combine at least one first video clip into at least one video file based on a standard data volume of a video file, and store the at least one video file based on a first video format.

In an optional implementation, the receiving module 201 is further configured to obtain a speed of a vehicle on which the camera component is located.

The processing module 202 is further configured to, if a decrease of the speed of the vehicle in a first time period exceeds a first threshold, store a first video clip in a second time period in an independent storage area.

A start time point of the first time period is a time point at which a driving pedal of the vehicle is stepped down, duration of the first time period is first preset duration, an intermediate time point of the second time period is the time point at which the driving pedal of the vehicle is stepped down, and duration of the second time period is second preset duration.

In an optional implementation, the processing module 202 is further configured to locate the first video clip in the second time period based on a timestamp of the first video clip. The timestamp of the first video clip is used to identify a time when recording of the first video clip starts.

The video processing apparatus provided in this embodiment of this disclosure may perform the actions in the foregoing method embodiments. Implementation principles and technical effects thereof are similar. Details are not described herein again.

Figure 21:
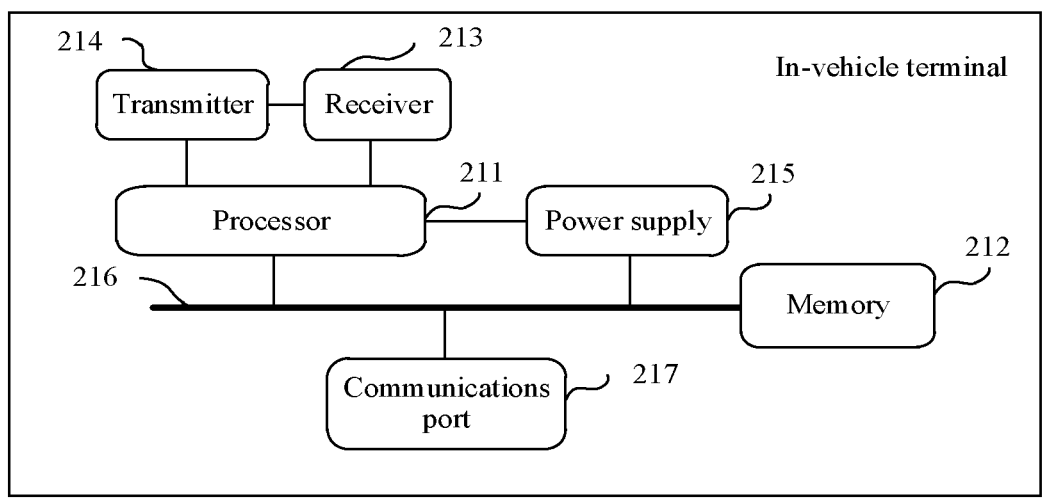
FIG. 21 is a schematic diagram of a structure of an in-vehicle terminal according to an embodiment of this disclosure.

FIG. 21 is a schematic diagram of a structure of an in-vehicle terminal according to an embodiment of this disclosure. As shown in FIG. 21, the in-vehicle terminal may include a processor 211 (for example, a central processing unit (CPU)), a memory 212, a receiver 213, and a transmitter 214. The receiver 213 and the transmitter 214 are coupled to the processor 211, the processor 211 controls a receiving action of the receiver 213, and the processor 211 controls a sending action of the transmitter 214. The memory 212 may include a high-speed RAM memory, or may further include a nonvolatile memory (NVM), for example, at least one magnetic disk memory. The memory 212 may store various types of information, to implement various processing functions and implement method steps of this embodiment of this disclosure. Optionally, the in-vehicle terminal in this embodiment of this disclosure may further include a power supply 215, a communications bus 216, and a communications port 219. The receiver 213 and the transmitter 214 may be integrated into a transceiver of the in-vehicle terminal, or may be independent transceiver antennas of the in-vehicle terminal. The communications bus 216 is configured to implement a communication connection between elements. The communications port 219 is configured to implement a connection and communication between the in-vehicle terminal and another peripheral.

In this embodiment of this disclosure, the memory 212 is configured to store computer-executable program code, and the program code includes information. When the processor 211 executes the information, the information enables the processor 211 to perform a processing action of the in-vehicle terminal in the foregoing method embodiment, enables the transmitter 214 to perform a sending action of the in-vehicle terminal in the foregoing method embodiment, and enables the receiver 213 to perform a receiving action of the in-vehicle terminal in the foregoing method embodiment. Implementation principles and technical effects thereof are similar. Details are not described herein again.

An embodiment of this disclosure further provides a chip, including a processor and an interface. The interface is configured to input/output data or instructions processed by the processor. The processor is configured to perform the methods provided in the foregoing method embodiments. The chip may be applied to an in-vehicle terminal.

An embodiment of this disclosure further provides a program. The program is configured to perform the methods provided in the foregoing method embodiments when executed by a processor.

An embodiment of this disclosure further provides a program product, for example, a computer-readable storage medium. The program product stores instructions. When the instructions are run on a computer, the computer is enabled to perform the methods provided in the foregoing method embodiments.

All or some of embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, procedures or functions according to embodiments of the present disclosure are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

The invention claimed is:

1. A video processing method comprising:
   receiving a video stream from a camera component;
   converting the video stream into at least one first data packet that can be independently encoded or decoded;
   synthesizing at least one second data packet that is of the at least one first data packet and that is obtained within a first reporting cycle into a first video clip, wherein the first reporting cycle is less than or equal to a maximum allowable video loss duration, and wherein the maximum allowable video loss duration is a longest loss time that is of a video shot by the camera component and that is allowed by a user when a fault occurs; and
   storing the first video clip.

2. The video processing method of claim 1, wherein the at least one first data packet is at least one transport stream (TS) packet.

3. The video processing method of claim 2, wherein the video stream comprises a TS packet, and wherein the video processing method further comprises removing a protocol header from the video stream to obtain the at least one TS packet from the video stream.

4. The video processing method of claim 2, wherein the video stream comprises an elementary stream (ES) packet, and wherein the video processing method further comprises:
   removing a protocol header from the video stream to obtain the ES packet from the video stream; and
   encapsulating the packet into the at least one TS packet.

5. The video processing method of claim 2, wherein the video stream is a first raw stream, and wherein the video processing method further comprises:
   removing a protocol header from the video stream to obtain, from the video stream, a second raw stream corresponding to the video stream;
   encoding the second raw stream to generate at least one elementary stream (ES) packet; and
   encapsulating the at least one ES packet into the at least one TS packet.

6. The video processing method of claim 2, further comprising:
   combining at least one first video clip into at least one video file based on a standard data volume of a video file; and
   storing the at least one video file based on a first video format.

7. The video processing method of claim 2, further comprising:
   obtaining a speed of a vehicle on which the camera component is located; and
   storing a second video clip in a second time period in an independent storage area when a decrease of the speed in a first time period exceeds a first threshold, wherein a start time point of the first time period is at which a driving pedal of the vehicle is stepped down, wherein the first time period is comprises a first preset duration, wherein an intermediate time point of the second time period is at which the driving pedal is stepped down, and wherein the second time period comprises a second preset duration.

8. The video processing method of claim 7, wherein before storing the second video clip, the video processing method further comprises locating the second video clip based on a timestamp of the second video clip, and wherein the timestamp identifies a time when recording of the second video clip starts.

9. A video processing apparatus comprising:
   a receiver configured to receive a video stream from a camera component; and
   a processor coupled to receiver and configured to:
      convert the video stream into at least one first data packet that can be independently encoded or decoded;
      synthesize at least one second data packet that is of the at least one first data packet and that is obtained within a first reporting cycle into a first video clip, wherein the first reporting cycle is less than or equal to a maximum allowable video loss duration, and wherein the maximum allowable video loss duration is a longest loss time that is of a video shot by the camera component and that is allowed by a user when a fault occurs; and
      store the first video clip.

10. The video processing apparatus of claim 9, wherein the at least one first data packet is at least one transport stream (TS) packet.

11. The video processing apparatus of claim 10, wherein the video stream comprises a TS packet, and wherein the processor is further configured to remove a protocol header from the video stream to obtain the at least one TS packet from the video stream.

12. The video processing apparatus of claim 10, wherein the video stream comprises an elementary stream (ES) packet, and wherein the processor is further configured to:
   remove a protocol header from the video stream to obtain the ES packet from the video stream; and
   encapsulate the ES packet into the at least one TS packet.

13. The vide processing apparatus of claim 10, wherein the video stream is a first raw stream, and wherein the processor is further configured to:
   remove a protocol header from the video stream to obtain, from the video stream, a second a stream corresponding to the video stream;
   encode the second raw stream to generate at least one elementary stream (ES) packet; and
   encapsulate the at least one ES packet into the at least one TS packet.

14. The video processing apparatus of claim 10, wherein the processor is further configured to:
   combine at least one first video clip into at least one video file based on a standard data volume of a video file; and
   store the at least one video file based on a first video format.

15. The video processing apparatus of claim 10, wherein the receiver is further configured to obtain a speed of a vehicle on which the camera component is located, and wherein the processor is further configured to store a second video clip in a second time period in an independent storage area when decrease of the speed in a first time period exceeds a first threshold, wherein a start time point of the first time period is at which a driving pedal of the vehicle is stepped down, wherein the first time period comprises a first preset duration, wherein an intermediate time point of the second time period is at which the driving pedal is stepped down, and wherein the second time period comprises a second preset duration.

16. The video processing apparatus of claim 15, wherein the processor is further configured to locate the second video clip based on a timestamp of the second video clip, wherein the timestamp identifies a time when recording of the second video clip starts.

17. A computer program product comprising computer-executable instructions that are stored on a non-transitory readable medium and that, when execute by a processor, cause an apparatus to:
receive a video stream from a camera component;
convert the video stream into at least one first data packet that can be independently encoded or decoded;
synthesize at least one second data packet that is of the at least one first data packet and that is obtained within a first reporting cycle into a first video clip, wherein the first reporting cycle is less than or equal to a maximum allowable video loss duration, and wherein the maximum allowable video loss duration is a longest loss time that is of a video shot by the camera component and that is allowed by a user when a fault occurs; and
store the first video clip.

18. The computer program product of claim 17, wherein the at least one first data packet is at least one transport stream (TS) packet.

19. The computer program product of claim 18, wherein the video stream comprises a TS packet, and wherein the computer-executable instructions further cause the apparatus to remove a protocol header from the video stream to obtain the at least one TS packet from the video stream.

20. The computer program product of claim 18, wherein the video stream comprises an elementary stream (ES) packet, and wherein the computer-executable instructions further cause the apparatus to:
remove a protocol header from the video stream to obtain the ES packet from the video stream; and
encapsulate the ES packet into the at least one TS packet.

* * * * *

UNITED STATES PATENT AND TRADEMARK OFFICE
CERTIFICATE OF CORRECTION

PATENT NO. : 11,856,321 B1
APPLICATION NO. : 17/970930
DATED : December 26, 2023
INVENTOR(S) : Pengfei Hou, Liwen Tan and Lei Zhang It is certified that error appears in the above-identified patent and that said Letters Patent is hereby corrected as shown below:

In the Claims

Claim 4, Column 21, Line 41: "the packet into" should read "the ES packet into"

Claim 13, Column 22, Line 43: "The vide processing" should read "The video processing"

Claim 13, Column 22, Line 47: "a second a stream" should read "a second raw stream"

Signed and Sealed this
Twenty-seventh Day of February, 2024

Katherine Kelly Vidal
*Director of the United States Patent and Trademark Office*